United States Patent [19]

Tsumaki et al.

[11] Patent Number: 4,630,942
[45] Date of Patent: Dec. 23, 1986

[54] GUIDING APPARATUS

[75] Inventors: Nobuo Tsumaki; Hiromitsu Tokisue; Hiroshi Inoue, all of Ibaraki, Japan

[73] Assignee: Hitachi, Ltd., Tokyo, Japan

[21] Appl. No.: 692,574

[22] Filed: Jan. 18, 1985

[30] Foreign Application Priority Data

Jan. 20, 1984 [JP] Japan .................................. 59-7173

[51] Int. Cl.$^4$ .................. B23Q 1/26; F16C 29/00; F16C 32/06; F16C 33/02
[52] U.S. Cl. .......................................... 384/8; 269/73; 384/12; 384/448
[58] Field of Search ............... 384/121, 100, 118, 192, 384/247, 248, 252, 253, 259, 396, 448; 308/3 A, 5 V, 5 R; 269/73

[56] References Cited

U.S. PATENT DOCUMENTS

| | | | |
|---|---|---|---|
| 3,053,589 | 9/1962 | Cameron | 384/118 |
| 3,100,130 | 8/1963 | Deffrenne | 384/118 |
| 3,271,086 | 9/1966 | Deffrenne | 384/100 X |
| 4,234,175 | 11/1980 | Sato et al. | 269/73 |
| 4,351,574 | 9/1982 | Furukawa et al. | 308/3 A |
| 4,504,048 | 3/1985 | Shiba et al. | 308/5 R X |

OTHER PUBLICATIONS

Academy of Precision Machine, Spring 1982, pp. 204–206.

Primary Examiner—Stuart S. Levy
Assistant Examiner—Lynn M. Sohacki
Attorney, Agent, or Firm—Antonelli, Terry & Wands

[57] ABSTRACT

A guiding apparatus having a slider supported in a floating manner above a base by means of hydrostatic bearings, a pressurized fluid supplying means for supplying the hydrostatic bearings with a pressurized fluid, and detecting means for detecting the displacement of the slider with respect to a designated coordinate. The pressure of the pressurized fluid from the pressurized fluid supplying means is adjusted in accordance with a signal which is obtained as a result of the comparison between the value representing the reference position of the slider with respect to the base and the value actually measured by the detecting means, thereby adjusting the sizes of the gaps for forming hydrostatic fluid film for the hydrostatic bearings, thereby to correct the position of the slider to the designated position. With this arrangement, the absolute position of the slider is precisely determined without being affected by disturbance factors such as the precision of assembling of the base and the slider. This guiding apparatus is suited to use as precision positioning apparatus such as that used in the assembly of photomodule elements.

2 Claims, 2 Drawing Figures

GUIDING APPARATUS

BACKGROUND OF THE INVENTION

The present invention relates to a guiding apparatus comprising a base and being a slider and guided by a hydrostatic bearing and, more particularly, to a guiding apparatus capable of performing an absolute positioning of the slider with respect to an intended coordinate position.

This type of guiding apparatus is used when a highly precise positioning is required as in the case of assembling of photo module elements or mounting of electronic parts on a printed board.

Hitherto, a hydrostatic guiding apparatus has been used as the means of precise positioning. This hydrostatic guiding apparatus has hydrostatic bearings for supporting the slider in a floating manner above the base, thereby ensuring low friction and high rigidity. An example of such a hydrostatic guiding apparatus is shown, for example, in the paper of symposium of the Academy of Precision Machine, spring in 1982, pp 204–206.

In this type of guiding apparatus, the slider floats relative to the base and moves along the base so that the absolute precision of positioning is determined finally by the precision of machining of the base.

The hydrostatic guiding means of this guiding apparatus is generally comprises two parallel guide surfaces presented by the base and an opposing inner surface of the slider. Therefore, the precision of positioning is largely affected not only by the precision of machining of the guide surfaces but also by the precision of assembling of the base and the slider having such guide surfaces.

The precision of positioning is affected also by a distortion or a displacement of the movable part including the slider during the driving of the slider along the base.

SUMMARY OF THE INVENTION

An object of the present invention is to provide a guiding apparatus capable of determining the position of the slider at a high precision without being affected by the precision or machining of distortion and bending of the base.

Another object of the present invention is to provide a guiding apparatus which can precisely determine the absolute position of the slider without being affected by the precision of assembling of the base and the slider.

Still another object of the present invention is to provide a guiding apparatus which can precisely determine the absolute position of the slider without being affected by distortion and deformation of the movable part including the slider.

To these ends, according to the present invention, there is provided a guiding apparatus comprising: a base; a movable slider supported above the base in a floating manner by means of hydrostatic bearings; pressurized fluid supplying means for supplying pressurized fluid to the hydrostatic bearings; detecting means for detecting the displacement of the slider with respect to the designated coordinate; memory means for storing the reference position of the slider with respect to the base; comparing means for comparing the value measured by the detecting means with the value of the reference position stored in the memory means; and correcting and controlling means for adjusting the pressure of the pressurized fluid supplying means in accordance with the signal from said comparing means thereby correcting the postion of the slider to the designated position.

The present invention is applicable to various types of guiding apparatus having at least a pair of hydrostatic bearings. The slider can have various forms such as rectangular form, triangular form, inverted V-form and inverted U-form depending on the form of the base.

The sensor for sensing the displacement of the slider with respect to the designated coordinate may be disposed apart from or directly on the outer peripheral surface of the slider.

According to the present invention, the position of the slider can be controlled freely within the range of clearance between the slider and the base, so that the absolute position of the slider with respect to the designated coordinate can be determined with a high precision without being substantially affected by the degrees of precision of machining of the base, precision of the assembling of the base and the slider and the distortion of the movable part including the slider.

DESCRIPTION OF THE PREFERRED EMBODIMENTS

Figure 1:
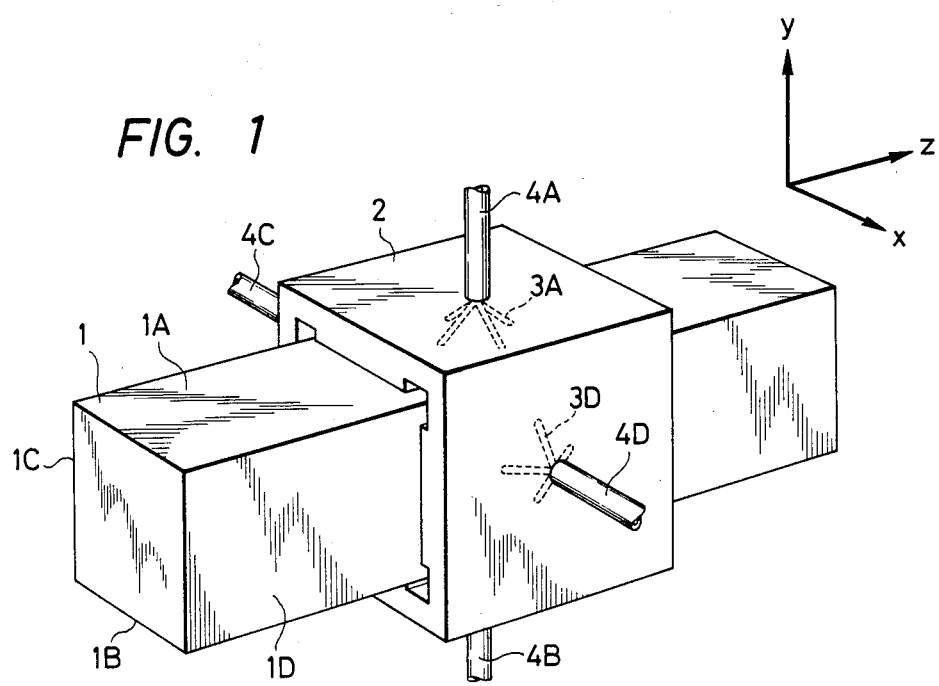
FIG. 1 is a perspective view of a base and a slider of the guiding apparatus in accordance with the present invention.

FIG. 1 shows a base and a slider of the guiding apparatus in accordance with the present invention. A slider 2 is mounted on a base 1 having a square cross-section with gaps GA,GB,GC,GD for forming hydrostatic fluid films between the periphery of the base 1 and the slider 2. The slider 2 is supported in a floating manner above the base 1 by means of hydrostatic fluid films formed in the gaps GA,GB,GC and GD.

The slider 2 is provided therein with restrictions 3A,3B,3C and 3D for supplying presurized fluid, in order to form the hydrostatic fluid films in the gaps GA,GB,GC and GD which are formed, respectively, between four guide surfaces 1A,1B,1C and 1D of the base 1 and the opposing inner surfaces 2A,2B,2C and 2D of the slider 2. These restrictions 3A,3B,3C and 3D are connected to pressurized fluid supply pipes 4A,4B,4C and 4D, respectively.

Figure 2:
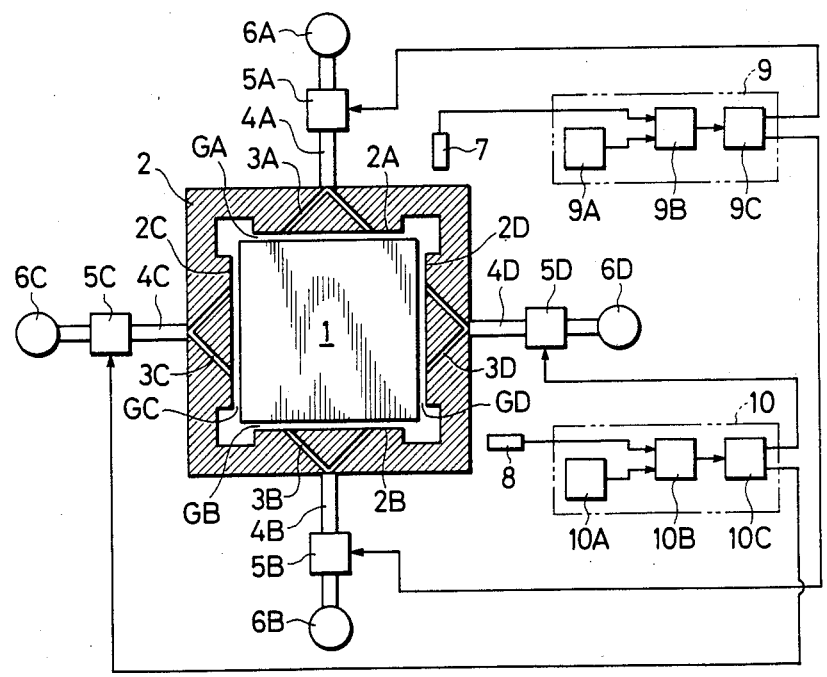
FIG. 2 is a schematic illustration of an embodiment of the guiding apparatus in accordance with the present invention.

FIG. 2 is a schematic illustration of an embodiment of the guiding apparatus. The above-mentioned pressurized fluid supply pipes 4A,4B,4C and 4D are connected to sources 6A,6B,6C and 6D of pressurized fluid through control valves 5A,5B,5C and 5D, respectvely.

The pressurized fluid supplied from these sources 6A,6B,6C and 6D is charged into respective gaps GA,GB,GC and GD through supply pipes 4A,4B,4C and 4D and restrictions 3A,3B,3C and 3D, respectively, thereby forming hydrostatic fluid films in respective gaps GA,GB,GC and GD. In consequence, the slider 2 is supported in a floating manner by the hydrostatic bearings above the base 1 and is linearly movable in the direction of z-axis by an external driving force.

Assuming here that the base 1 has a square cross-section having a side length of 500 mm, and that the sizes of the gaps GA,GB,GC and GD fall within the ranges of between 10 and 30 μm, while the weight of the movable part including the slider 2 is 20 to 25 Kg, the degree of parallelism of the base 1 in the z-axis direction is not smaller than 1 micron, even when the precision of assembling is taken into account.

On the periphery of the slider 2, are disposed a first sensor 7 for detecting the amount of displacement of the slider in the y-axis direction and a second sensor 8 for detecting the amount of displacement of the slider 2 in the x-axis direction.

The positional relationship between the slider 2 and both sensors 7,8 in the state where the slider 2 is floated but not moved constitutes the reference position for guiding the slider 2 to the designated working position. Thus, the degree of parallelism in the z-axis direction is maintained by using the reference position, i.e., the absolute coordinate position of the slider 2 with respect to the designated coordinate.

The first sensor 7 is connected to a controller 9 while the second sensor 8 is connected to a controller 10. The controllers 9 and 10 are connected, respectively, to the control valves 5A and 5B, as well as to the control valves 5C and 5D, respectively.

The controllers 9 and 10 comprise, respectively, memory sections 9A,10A which store the set values of the y-axis and x-axis distances between the sensors 7,8 and the outer surfaces of the slider 2 in the reference position, comparators 9B,10B adapted to receive both the set distances and the measured value delivered by the sensors 7,8 and adapted to compare the set distances with the measured values to judge whether the set distances differ by the measured values, and control sections 9C and 10C adapted to deliver control signals to the control valves 5A,5B and 5C,5D in response to the signals from the comparators 9B and 10B.

The operation of this embodiment is as follows:

The pressurized fluid discharged from the sources 6A,6B,6C and 6D is supplied to corresponding gaps GA,GB,GC and GD through the control valves 5A,5B,5C and 5D, supply pipes 4A,4B,4C and 4D and restrictions 3A,3B,3C and 3D. In consequence, pressurized fluid films serving as the hydrostatic bearings are formed in these gaps so that the slider 2 is floated with respect to the base 1. If the pressure of the fluid supplied from the sources is constant and the force applied to the slider 2 is constant, the sizes of the gaps GA,GB,GC and GD also are maintained at constant values.

The slider 2 moves in the z-axis direction by the driving force of a ball screw, linear motor or the like. Any distortion or the curvature of the base 1 is detected by the first and the second sensors 7 and 8 and is inputted to the controllers 9 and 10. Then, the comparing sections 9B and 10B of the controllers 9 and 10 compare the actually measured value between the sensors 7,8 and the slider 2 with the predetermined distance values between the sensors 7,8 and the slider 2 stored in the memory sections 9A and 10A.

The result of the comparison performed by the comparing sections 9B and 10B are examined by the control sections 9C and 10C. Then, the control section 9C and/or the control section 10C produces a control signal and delivers the same to the control valves 5A,5B and/or 5C,5D such as to maintain the gaps GA,GB and/or GC,GD at the constant regulated sizes. In response to the control signal, the control valves 5A,5B and/or the control valves 5C,5D adjust the pressures of the pressurized fluid supplied to the gaps GA,GB or the gaps GC,GD thus correcting the position of the slider 2 both in the x-axis and y-axis directions.

It is thus possible to correctly position the slider at the absolute position, i.e. at the designated position, with respect to the base 1 regardless of any distortion and curvature in the base 1.

Although the present invention has been described with reference to the case where the base has a distortion or curvature, this is only illustrative and the present invention can be applied equally to the cases where a precise positioning of the slider at the designated position with respect to the base when the base and the slider are assembled at an inferior precision of assembling and when distortion of the movable part including the slider may occur during the work.

What is claimed is:

1. A guiding apparatus comprising: a base having two pairs of opposing parallel surfaces; a slider supported above the base in a floating manner by means of hydrostatic bearings and linearly movable in a z-axis direction along said base; pressurized fluid supplying means for supplying pressurized fluid to said hydrostatic bearings; detecting means for detecting the displacement of said slider with respect to a designated coordinate position, which is independent with said base and said slider in an x-axis and y-axis direction; memory means for storing a reference position of said slider with respect to said base in said x-axis and said y-axis direction; comparing means for comparing the values of the x-axis distance and y-axis distance measured by said detecting means with the respective values of the reference position in the x-axis direction and the y-axis direction stored in said memory means; and correcting and controlling means for adjusting the pressure of said pressurized fluid supplying means in accordance with the signal from said comparing means thereby correcting the position of said slider with respect to the designated coordinate position so as to enable accurate positioning of said slider along said base, said slider being a rectangular member, and said correcting and controlling means controlling two pairs of opposing gaps for forming hydrostatic fluid films for said hydrostatic bearings.

2. A guiding apparatus according to claim 1, further comprising control valve means for adjusting the pressure of said pressurized fluid supplying means in accordance with a control signal from said correcting and controlling means.

* * * * *